(12) United States Patent
Pachisia et al.

(10) Patent No.: US 11,295,336 B2
(45) Date of Patent: Apr. 5, 2022

(54) SYNTHETIC CONTROL GENERATION AND CAMPAIGN IMPACT ASSESSMENT APPARATUSES, METHODS AND SYSTEMS

(71) Applicant: Quantifind, Inc., Menlo Park, CA (US)

(72) Inventors: Sejal Pachisia, Palo Alto, CA (US); Vineet Goel, Menlo Park, CA (US); Jen Liu, Palo Alto, CA (US); John Stockton, Emerald Hills, CA (US); Arnau Tibau-Puig, Fremont, CA (US)

(73) Assignee: Quantifind, Inc., Menlo Park, CA (US)

( * ) Notice: Subject to any disclaimer, the term of this patent is extended or adjusted under 35 U.S.C. 154(b) by 362 days.

(21) Appl. No.: 15/586,854

(22) Filed: May 4, 2017

(65) Prior Publication Data

US 2017/0323327 A1    Nov. 9, 2017

Related U.S. Application Data

(60) Provisional application No. 62/331,920, filed on May 4, 2016.

(51) Int. Cl.
  *G06Q 30/02*       (2012.01)
(52) U.S. Cl.
  CPC ..... *G06Q 30/0243* (2013.01); *G06Q 30/0244* (2013.01)
(58) Field of Classification Search
  CPC .................. G06Q 30/0244; G06Q 30/0243
  See application file for complete search history.

(56) References Cited

U.S. PATENT DOCUMENTS

| | | | |
|---|---|---|---|
| 8,346,710 B2 * | 1/2013 | Chan ..................... | G06Q 30/02 706/52 |
| 9,654,593 B2 * | 5/2017 | Garg ..................... | H04L 67/306 |
| 2008/0256059 A1 * | 10/2008 | Chang ................... | G06Q 30/02 |
| 2012/0323674 A1 * | 12/2012 | Simmons ............... | G06Q 30/02 705/14.41 |

(Continued)

OTHER PUBLICATIONS

Alberto Abadie, Alexis Diamond, and Jens Hainmueller, "Synthetic control methods for comparative case studies: Estimating the effect of californias tobacco control program", Journal of the American Statistical Association, vol. 105 No. 9, Jun. 2010, pp. 493-505.

(Continued)

*Primary Examiner* — Azam A Ansari
(74) *Attorney, Agent, or Firm* — Irell & Manella LLP

(57) ABSTRACT

The SYNTHETIC CONTROL GENERATION AND CAMPAIGN IMPACT ASSESSMENT APPARATUSES, METHODS AND SYSTEMS ("SCG") provides a platform that, in various embodiments, is configurable to evaluate efficacy and/or return on investment of advertising and/or other media campaigns and/or to recommend actions for improvement thereof. In some implementations, multi-faceted campaigns of media and/or advertising behavior (e.g., including one or more of: internet advertising, television advertising, radio advertising, print advertising, social media publication, product placement, and/or the like) may be considered as a whole in relation to global metric behaviors and/or patterns in order to evaluate the efficacy and/or return on investment associated with the campaign as a whole.

21 Claims, 7 Drawing Sheets

(56) References Cited

U.S. PATENT DOCUMENTS

2014/0129320 A1* 5/2014 Jebara .................. G06Q 30/00
705/14.42

OTHER PUBLICATIONS

Alexandre Belloni, Victor Chernozhukov and Christian Hansen, "High-dimensional methods and inference on structural and treatment effects", Journal of Economic Perspectives, vol. 28(2), 2014, pp. 1-23.

Peter J. Brockwell and Richard A. Davis, "Springer Series in Statistics—Time Series: Theory and Methods", Springer Science & Business Media, 2012, 591 pages.

Kay H. Brodersen, Fabian Gallusser, Jim Koehler, Nicolas Remy and Steven L. Scott, "Inferring Causal Impact Using Bayesian Structural Time-Series Models", The Annals of Applied Statistics, vol. 9(1), 2015, pp. 247-274.

* cited by examiner

SYNTHETIC CONTROL GENERATION AND CAMPAIGN IMPACT ASSESSMENT APPARATUSES, METHODS AND SYSTEMS

PRIORITY CLAIM

This application is a non-provisional of, and claims priority under 35 U.S.C. § 119, to prior U.S. provisional patent application Ser. No. 62/331,920 entitled, "Synthetic Control Generation and Campaign Impact Assessment Apparatuses, Methods and Systems," filed May 4, 2016, which is hereby expressly incorporated in its entirety herein by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address efficient data collection, storage, and evaluation, and more particularly, include SYNTHETIC CONTROL GENERATION AND CAMPAIGN IMPACT ASSESSMENT APPARATUSES, METHODS AND SYSTEMS.

BACKGROUND

The advent of the internet and mobile device technologies have brought about a sea change in the distribution and availability of information. Ubiquitous electronic communications have resulted in large volumes of information being generated and, often, made widely available. Widespread availability and accessibility of information technology has yielded new modalities of advertising and marketing.

SUMMARY

A platform is disclosed that, in various embodiments, is configurable to evaluate efficacy and/or return on investment of advertising and/or other media campaigns and/or to recommend actions for improvement thereof. In some implementations, multi-faceted campaigns of media and/or advertising behavior (e.g., including one or more of: internet advertising, television advertising, radio advertising, print advertising, social media publication, product placement, and/or the like) may be considered as a whole in relation to global metric behaviors and/or patterns in order to evaluate the efficacy and/or return on investment associated with the campaign as a whole.

In some embodiments, a processor-implemented method is disclosed, comprising: partitioning a collection of user profiles into a plurality of user subsets based on at least one profile characteristic; generating an intersection graph, wherein each node of the intersection graph corresponds to one of the plurality of user subsets and each edge is weighted in proportion to the size of an intersection of user sets corresponding to nodes connected by the edge; identifying at least one target group from the plurality of user subsets and at least one campaign period; collecting measurements of target metric data for the target group at different points in time, including points in the campaign period; collecting measurements of non-target metric data for each of the plurality of user subsets other than the target group at the different points in time; generating a counterfactual baseline from the non-target metric data and at least one set of synthetic control parameters; and generating at least one campaign impact metric based on comparing the target metric data with the counterfactual baseline.

BRIEF DESCRIPTION OF THE DRAWINGS

The accompanying appendices and/or drawings illustrate various non-limiting, example, innovative aspects in accordance with the present descriptions.

Figure 1:
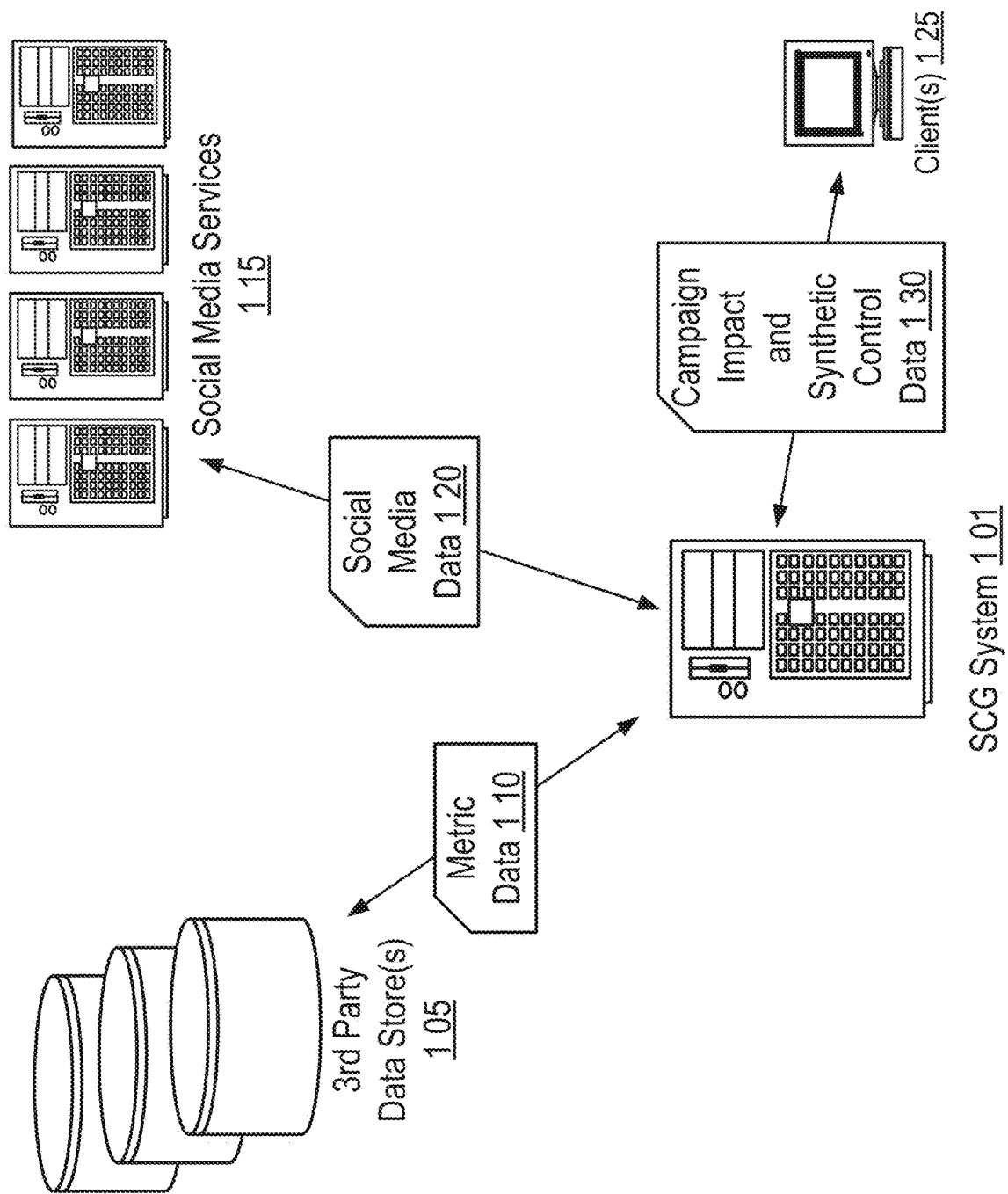
FIG. 1 shows aspects of data flow surrounding an SCG implementation with related entities in one embodiment of SCG operation.

Further aspects of various embodiments of SCG operation are provided in attached Appendices A-C.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

The SYNTHETIC CONTROL GENERATION AND CAMPAIGN IMPACT ASSESSMENT APPARATUSES, METHODS AND SYSTEMS ("SCG") provides a platform that, in various embodiments, is configurable to identify, display, and act upon insights derived from large volumes of data. In one embodiment, the SCG is configurable to evaluate efficacy and/or return on investment of advertising and/or other media campaigns and/or to recommend actions for improvement thereof. Using a synthetic control signal for counterfactual assessment of the effects of an intervention (e.g., marketing campaign) presents the ability to address shortcomings of so-called Difference-in-Difference approaches. In other embodiments, the SCG may be configurable to determine values and relationships for primal data, which is used to construct natural language insights. Insight records may be automatically filtered and/or sorted according to various selectable criteria. In some embodiments, insight records may be employed to generate natural language reports, generate action-item reports, and/or implement recommended actions such as advertisement purchases. In various embodiments, the SCG may be configurable as a topic builder, permitting users to discovery topics, tags, labels, and/or the like to assign to documents in a corpus and/or to facilitate highly optimized queries over volumes of data. In other embodiments, the SCG may be configurable for influence discovery across social media and/or other structured and/or unstructured document sources. For example, the SCG may be configured to identify subsets of social media users responsible for driving one or more global metrics (e.g., sales, subscriptions, and/or the like) from unstructured data, e.g., without requiring exemplars, templates, and/or the like for such users in advance.

In some embodiments, the SCG may be configurable to evaluate efficacy and/or return on investment of advertising and/or other media campaigns and/or to recommend actions for improvement thereof. For example, in one implementation the SCG may employ influence discovery tools in order to identify actions, activities, terms, phrases, images, company behaviors, spending patterns, and/or the like that are highly correlated with global metric behaviors and/or patterns. In some implementations, multi-faceted campaigns of media and/or advertising behavior (e.g., including one or more of: internet advertising, television advertising, radio advertising, print advertising, social media publication, product placement, and/or the like) may be considered as a whole in relation to global metric behaviors and/or patterns in order to evaluate the efficacy and/or return on investment associated with the campaign as a whole.

In one implementation, a particular test corpus may be compared against a broader control corpus for identification of trends with respect to one or more global metrics. For example, an advertiser may focus on a test group comprising watchers of a particular television program and compare this with a control group comprising watchers of television in general. Correlations of test group activities, documents, data, and/or the like with the global metric may then be compared with correlations for the same information of the control group in order to determine the relative efficacy of focusing advertisements on the test group. In another implementation, a test group and control group may comprise the same group at different times.

In another implementation, return on investment may be determined for sponsorship campaigns, e.g., involving sports, teams, celebrities, and/or the like. For example, celebrity followers in social data may be monitored to identify changes in the usage of global metric correlated intent drivers before and after a campaign. In one implementation, a control group may be comprised of general users, not necessarily celebrity followers, who are also using the same intent drivers, in order to determine the relative efficacy of the sponsorship campaign with respect to the particular celebrity.

In one implementation, various factors which may influence the volume of intent drivers in social data may be accounted for in order to not unduly influence results. For example, account may be taken of factors such as, but not limited to: scaling of the number of social media users over time, geography, from one social media service to another, and/or the like; census and/or other demographic variations over time, geography, and/or the like; seasonal variations in social media usage (e.g., associated with the release of a new mobile device, weather, and/or the like).

FIG. 1 shows aspects of data flow surrounding an SCG implementation with related entities in one embodiment of SCG operation. An SCG system 101 may interact with one or more third party data stores 105, such as news feeds, market feeds, databases, and/or the like to receive metric data 110, such as revenues, profits, costs, sales volume, activity level, and/or the like. In some implementations, the SCG system may receive such data from a client agency for whom the SCG system is performing its campaign impact assessment. An SCG system may further interact with any of a variety of social media services 115 (e.g., Facebook, Twitter, Instagram, Snapchat, and/or the like) to receive social media information 120, such as user profile information, user activity information, user content, feeds thereof, and/or the like. The SCG system may process received data in accordance with the description provided herein to provide one or more client interfaces 125 with campaign impact data, synthetic control information and/or modeling, and/or the like 130. In some implementations, the client interfaces may be associated and/or integrated with the third party data stores 105 and/or the social media services 115.

Figure 2:
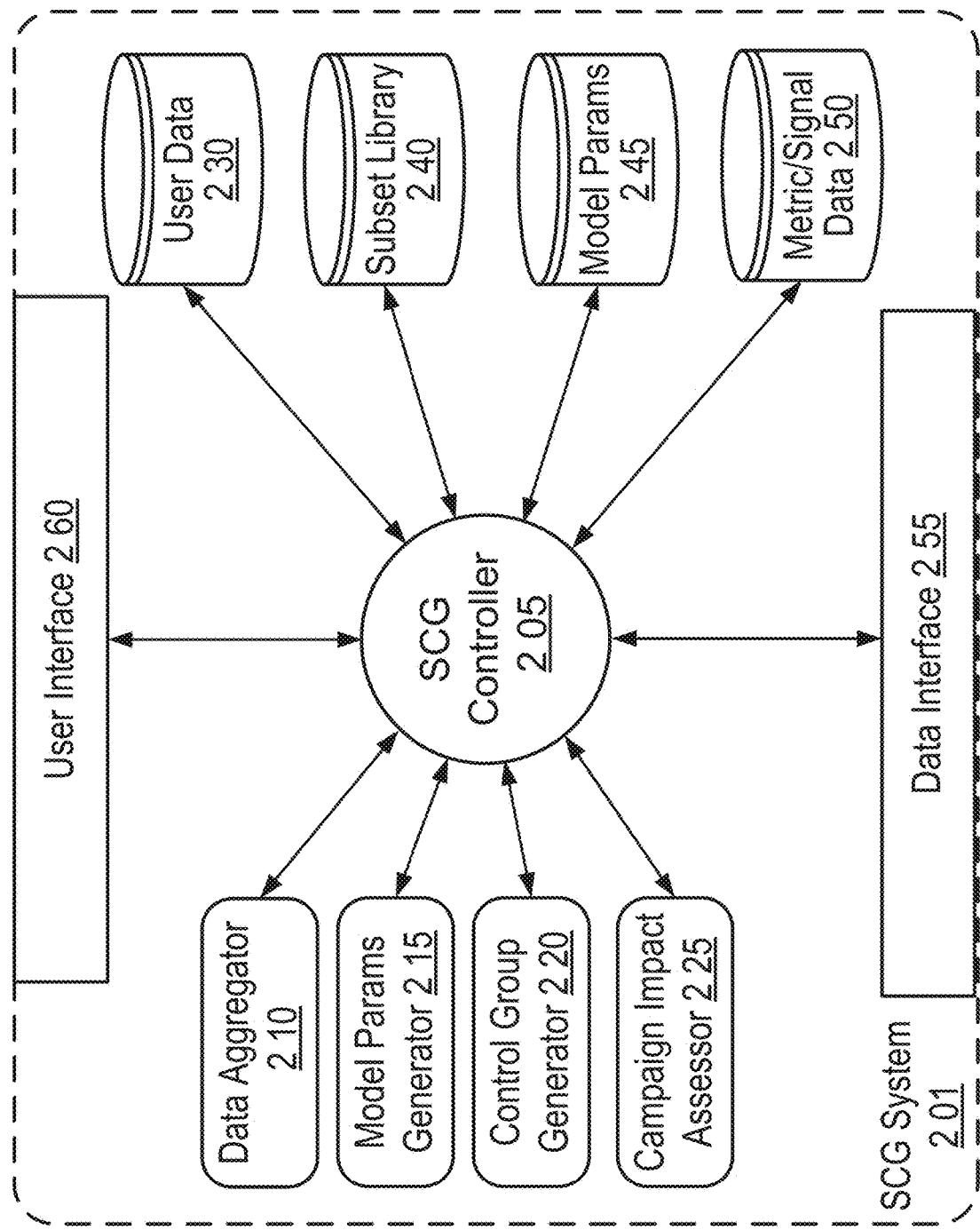
FIG. 2 shows an implementation of data flow between and among SCG system components in one embodiment of SCG operation.

FIG. 2 shows an implementation of data flow between and among SCG system components in one embodiment of SCG operation. The SCG system 201 may contain a number of operational components, logical groupings, data stores, and/or the like. An SCG controller 205 may serve a central role in some embodiments of SCG operation, serving to orchestrate the reception, generation, modification, and distribution of data and/or instructions to, from, and between SCG components and/or mediate communications with external entities and systems. In one embodiment, the SCG controller may be housed separately from other controllers, modules, components, databases, and/or the like, within or external to the SCG system 201, while in another embodiment, some or all of the other modules, components, controllers, databases, and/or the like within and/or external to the SCG system may be housed within and/or configured as part of the SCG controller. Further detail regarding implementations of SCG controller operations, modules, components, and databases is provided below.

In the illustrated embodiment, the SCG controller may be coupled to a plurality of components configured to implement SCG functionality and/or services. For example, the SCG controller 205 may be coupled to a Data Aggregator component 210 which may, in one implementation, be configured to receive and process metric data, user profile data, and/or the like, to annotate received data, produce metadata, collect and group data, and/or the like. The SCG controller 205 may further be coupled to a Model Parameters Generator component 215 which may, in one implementation, be configured to receive, process, and/or generate parameters of the synthetic control model disclosed herein and described below. In some implementations, the Model Parameters Generator component 215 may effect determination of synthetic control parameters. The SCG controller 205 may further be coupled to a Control Group Generator component 220 which may, in one implementation, be configured to evaluate user groupings and/or sets of user profiles, evaluate set overlaps, generate graphs, determine mean predictive error, assess candidate synthetic control signals, and/or the like. The SCG controller 205 may further be coupled to a Campaign Impact Assessor component 220 which may, in one implementation, evaluate a counterfactual baseline, synthetic control, and/or the like and determine an estimated campaign impact.

In the illustrated embodiment, the SCG controller may be configured to couple to external entities and/or systems via one or more interface components. For example, the SCG controller 205 may be coupled to a data interface 255. In one implementation, the data interface 255 may mediate communications to and from remote databases to send data requests, data tokens, and/or the like and receive requested data, data updates, time information, field identifiers, tables, and/or the like. The SCG controller 205 may further be coupled to a user interface 260. In one implementation, the user interface 260 may mediate communications to and from a user to receive administrator and/or user inputs, settings, configurations, selections, configuration inputs and/or files, campaign impact assessment requests, data inputs, updates, and/or the like and to send graphical user interface screens, requested data, synthetic control information, campaign impact information, and/or the like. In various implementations, one or more of the interface components described above may serve to configure data into application, transport, network, media access control, and/or physical layer formats in accordance with a network transmission protocol, such as, but not limited to FTP, TCP/IP, SMTP, Short Message Peer-to-Peer (SMPP), and/or the like. For example, the interfaces may be configured for receipt and/or transmission of data to an external and/or network database. The interfaces may further be configurable to implement and/or translate Wireless Application Protocol, VOIP, and/or the like data formats and/or protocols. The interfaces may further house one or more ports, jacks, antennas, and/or the like to facilitate wired and/or wireless communications with and/or within the SCG system.

In one implementation, the SCG controller 205 may further be coupled to one or more databases configured to store and/or maintain SCG data. A User database 230 may include information such as, but not limited to, user ID, name, login, password, demographic information, interest information, activity information, membership information, financial information, and/or the like. A Subset Library database 240 may include information such as, but not limited to, user profile sets and/or subsets, synthetic control signals, candidate synthetic control signals, target sets, hold over sets, and/or the like. A Model Parameters database 245 may include information such as, but not limited to, error thresholds, synthetic control parameters, coefficients, weighting factors, and/or the like. A Metric/Signal database 250 may include information such as, but not limited to, metric data, synthetic control signal data, time, and/or the like.

Figure 3:
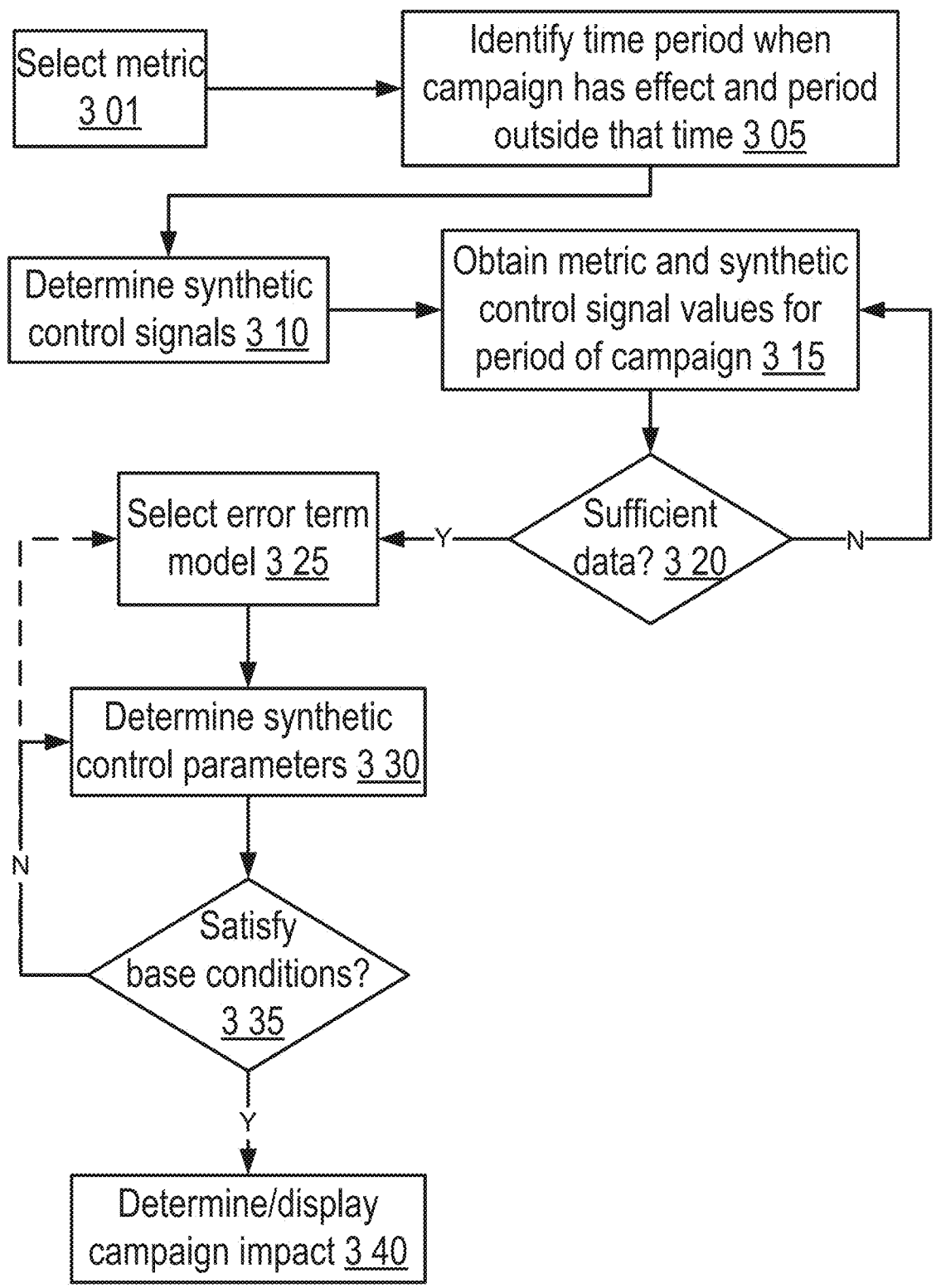
FIG. 3 shows an implementation of logic flow for synthetic control signal generation in one embodiment of SCG operation.

FIG. 3 shows a synthetic control signal generation process for counterfactual awareness of the effects of an intervention (e.g., marketing campaign) in one embodiment. This allows measurement of the impact of a campaign on a selected metric $Y_t$ 301, such as but not limited to a revenue, profit, cost, chatter frequency, chatter volume, and/or the like, associated with a brand, product, company, division, individual, groups thereof, and/or the like. The campaign may have an associated time period of effect and time period outside of that effect 305. Denote:

$P \subseteq \{1, \ldots, T\}$ The time period over which the campaign had an effect;

$\overline{P} \subseteq \{1, \ldots, T\} \setminus P$ The time points outside this campaign period;

$Y_t(1)$ The observed metric in the scenario where the campaign was applied;

$Y_t(0)$ The metric in the (unobserved) scenario of no campaign.

Thus, $$Y_t(1) = Y_t(0), t \in \overline{P}$$

The impact of the campaign during the campaign period can be specified as, $$\Delta_t = Y_t(1) - Y_t(0), t \in P$$

In one embodiment, a counterfactual methodology introduces at least one set of control signals $X_t^s$, $s=1, \ldots, S$ 310 such that a counterfactual, synthetic control, and/or the like can be constructed. In one implementation, a counterfactual, synthetic control, and/or the like may take a form similar to the following example:

$$Y_t(0) \approx \sum_{s=1}^{S} \beta^s X_t^s(0) + \epsilon_t, t \in P$$

Here, $\beta^s$ are synthetic control parameters (e.g., constant coefficients) and $\epsilon_t$ is an error term. As $Y_t(0)$ and $X_t^s(0)$ may each be unobserved and/or unobservable for $t \in P$, the following two assumptions may be employed in some implementations:

$$Y_t(1) \approx \sum_{s=1}^{S} \beta^s X_t^s(1) + \epsilon_t, t \in \overline{P}$$

$$X_t^s(1) = X_t^s(0), t = 1, \ldots, T \forall s$$

The former reflects the assumption that the synthetic control signals are good predictors, and the second reflects the assumption that the control signals are not significantly impacted by the campaign. Accordingly, the campaign effect may be determined, such as according to the following example formula, which is based on observable quantities:

$$\hat{\Delta}_t = Y_t(1) - \sum_{s=1}^{S} \beta^s X_t^s(1), t \in P$$

In some embodiments, in order to estimate the effect of the campaign, the synthetic control parameters, $\beta^s$ should be estimated, such as from observed data regarding the observed metric and/or synthetic control signal values 315. In some implementations, a criteria of sufficiency for such data may be applied 320, such as may be based on the total volume of data, the density of data in a given time period, density of data across a collection of samples, and/or the like.

In one implementation, a process for measuring and/or determining synthetic control parameters may depend on, and/or be selected (e.g. manually or automatically) based on the specific model chosen and/or selected for the error term 325. For example, in one case where the error $\epsilon_t$ have zero mean with equal variance and are uncorrelated across t, the synthetic control parameters may be determined as a solution to the following least squares problem:

$$\beta^{LS} \leftarrow \arg\min_{\beta^1, \ldots, \beta^S} \sum_{t=\overline{P}} \left( Y_t(1) - \sum_{s=1}^{S} \beta^s X_t^s(1) \right)^2$$

In another embodiment, where the errors exhibit serial correlation structure, they can be modeled according to a Seasonal Auto Regressive Integrated Moving Average (SARIMA) process parameterized by a set of parameters, $\theta$, and determine the synthetic control parameters, $\beta^s$, according to the maximum-likelihood estimates of a linear regression model with SARIMA errors:

$$\beta^{SARIMA} \leftarrow \arg\min_{\beta^1, \ldots, \beta^S} \min_{\theta \in \Theta} \mathcal{L}(\{Y_t(1)\}_{t \in \overline{P}}, \theta, \{\beta_s\}_{s \in S})$$

In one implementation, L denotes the likelihood function, log-likelihood function, and/or the like for a non-zero mean SARIMA model.

In alternative implementations, the synthetic control parameters may not be treated as deterministic model parameters. For example, in one implementation, one or more Bayesian time series models may be employed, with campaign effect estimates $\hat{\Delta}_t$ obtained by sampling a posterior distribution of the observations in a state-space model. In various other implementations, other error models may also be employed, and the general process described is agnostic to the specific generative model chosen for the synthetic control. Given a subset of control signals, the user can decide and/or an automatic system may determine which generative model to use based, for example, on data characteristics, system and/or user experience, and/or the like. Once the synthetic control parameters have been determined 330, the system may determine whether the determined parameters satisfy base conditions 335, such as respecting the condition that the synthetic control signals are good predictors of metric values and/or that the synthetic control signals are unaffected by the campaign. If not, a further determination of synthetic control parameters may be undertaken 330 and/or the system, may request a new selection and/or automatically adjust the error term model 325. Otherwise, the system may determine and/or display campaign impact assessment information 340, such as in accordance with the further description below.

Figure 4:
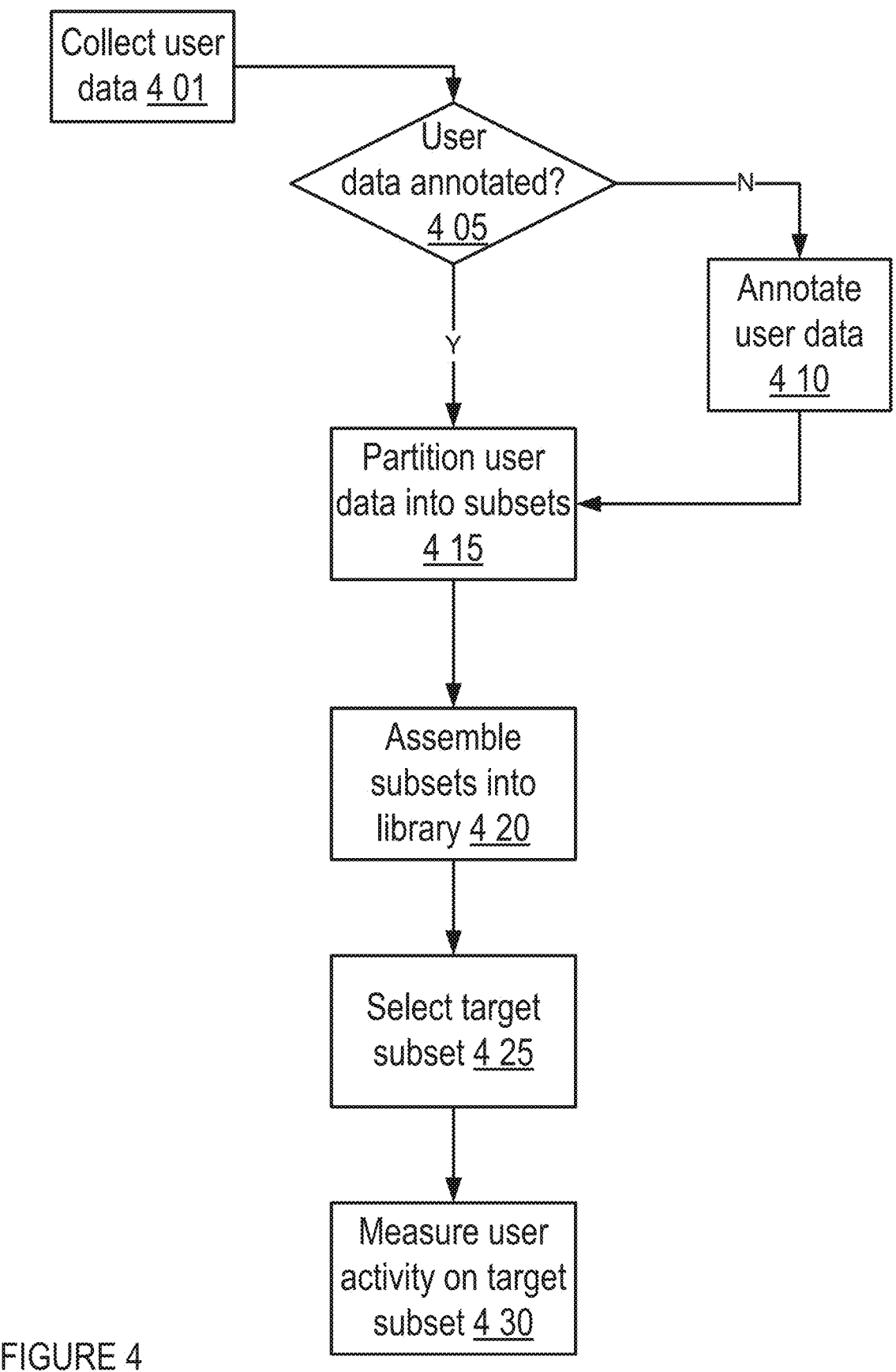
FIG. 4 shows an implementation of logic flow for campaign impact analysis based on user activity measurements in one embodiment of SCG operation.

In some embodiments, campaign impact analysis may be performed based on user activity measurements, such as illustrated in FIG. 4 in one embodiment. Data regarding the features characterizing a population of users, U, may be collected 401, where, in one implementation, each element u∈U corresponds to a user profile. In one implementation, a determination may be made as to whether each user profile is annotated 405 and, if not, the profile may be annotated with information about, for example, the user's centers of interest, demographic information, and/or the like 410. The users may be partitioned into (possibly intersecting) subsets, $G_i \subseteq U$, i=1, . . . , I, of users with similar characteristics 415. For example, in one implementation, $G_1$ may correspond to users showing the characteristics of Soccer Fans, while $G_2$ corresponds to users showing the characteristics of Basketball Fans. Of course, it is possible for some users to show characteristics of both Soccer Fans and Basketball Fans. Thus, the intersection of any two subsets of user profiles $G_i \cap G_j$, i≠j may be non-empty (e.g., if one user profile qualifies for inclusion in more than one subset).

In one implementation, a library of user subsets from the profile information of each user may be constructed 420, such as by grouping users and/or profiles having similar characteristics together. In some implementations, such grouping may be performed via an unsupervised or semi-supervised machine learning approach. In other implementations, groupings may be performed automatically based upon detected characteristics and/or may be performed manually, such as by a system administrator or user.

In some embodiments, the intersection graph, G=(V, E) may be generated for the subsets in the library. In one implementation, the intersection graph may comprise a weighted, undirected graph having a node for each of the I groups (V={1, . . . , I}), and an edge between two nodes having a weight proportional, e.g., to the size of the intersection of the subsets corresponding to each node. In some implementations, weighting may be linearly proportional to the overlap while, in alternative implementations, the weighting may be non-linearly dependent upon the amount of overlap. In one implementation, the degree of overlap may be characterized by a formula similar to the following example:

$$e_{i,j} = \frac{|G_i \cap G_j|}{\min(|G_i|, |G_j|)}, i=1, \ldots, I, j=1, \ldots, I$$

An edge set may be denoted by E, determined as the union of edges in the graph G having non-zero weight:

$$E=\{(i,j,e_{i,j}):e_{i,j}>0, i=1, \ldots, I, j=1, \ldots, I\}$$

The effect of a marketing campaign on a subset of users (referred to as the "target group") $T \subseteq U$ may then be determined (note, it may be assumed without loss of generality that T corresponds to one of the subsets $G_i$ in the library) 425. In one implementation, measurements are obtained on the activity of this subset at different points in time 430, which are denoted by $Y_t^T$. For example, in one implementation, the measured activity may comprise the number of times a user performs a certain action, such as posting about a particular topic, product, brand, company, groups of the same, and/or the like on one or more social media sites and/or in one or more social media feeds. The same quantity may also be measured for each of the groups in the library of subsets, with measurements for those groups denoted by $Y_t^{G_i}$, i=1, . . . , I.

In some embodiments, the effect of a campaign on the activity measurements $Y_t^T$ of the target users may be evaluated by comparing target measurements $Y_t^T$ to a counterfactual baseline constructed from measurements of a subset of the groups $Y_t^{G_i}$, i=1, . . . , I, such as according to a formula similar to the following example:

$$\hat{\Delta}_t = Y_t^T - \sum_{r \in R} \hat{\beta}^r Y_t^{R_r}, t \in P$$

Here, $R \subseteq \{1, \ldots, I\}$ denotes the indices of the subset of groups in the library selected and/or otherwise designated as controls. In one implementation, the set R is selected and/or determined such that the measurements $Y_t^{G_i}$ verify the assumptions that the synthetic control signals are good predictors, and that the synthetic control signals are not impacted by the campaign, as discussed above.

Given a subset of groups R, one or more tests may be performed to determine whether the assumption that the synthetic control signals are good predictors is met. For example, a model may be trained with $\{Y_t^{G_i}\}_{r \in R}$ as covariates using a subset of the data points $S \subset P$, and then the performance of the trained model may be evaluated on a hold-out set H=P\S. For example, in one implementation, the mean predictive error of the trained model may be determined, such as according to a formula similar to the following example:

$$\text{Error}(R) := \frac{1}{H} \sum_{t \in H} \text{Error}\left(Y_t^T, \sum_{r \in R} \hat{\beta}^r Y_t^{G_r}\right)$$

In this example, R corresponds to the subset of counterfactuals at hand and $\{\hat{\beta}^r\}_{r \in R}$ are the model parameters found from the training subset S. The choice of the error metric, Error(X,Y), may vary in different implementations. For example, in one implementation, a Mean Square Error (MSE) may be employed, such as according to a formula similar to the following example:

$$\text{Error}^{MSE}(X,Y) := (X-Y)^2$$

In another implementation, a Mean Absolute Percentage Error (MAPE) may be employed, such as according to a formula similar to the following example:

$$\text{Error}^{MAPE}(X, Y) := \frac{|X-Y|}{X}$$

In another implementation, a bias or Mean Error (ME) may be employed, such as according to a formula similar to the following example:

$$\text{Error}^{ME}(X,Y) := X-Y$$

In one implementation, the condition for satisfying the assumption that the synthetic control signals are good predictors is that Error(R)≤$\varepsilon_0$, where $\varepsilon_0$ is a specified tolerance parameter, such as may be fixed, variable, supplied by a user, determined based on prior and/or historical error analyses, and/or the like.

Given a subset of groups R, one or more tests may be performed to determine whether the assumption that the synthetic control signals are not impacted by the campaign is met. In one implementation, an assumption will be made that, if a campaign is targeting a given group T, then the measurements corresponding to groups of users unrelated to T should not be impacted by the campaign. In one implementation, the condition for determining that user groups in control set R satisfy this assumption (referred to as the "targeting condition") takes a form similar to the following example:

$$\frac{|T \cap G_i|}{\min(|T|, |G_i|)} \leq \varepsilon_1, \forall\ i \in R$$

Here, $\varepsilon_1$ is a specified threshold parameter, such as may be fixed, variable, supplied by a user, determined based on prior and/or historical error analyses, and/or the like.

In one implementation, a further condition may be imposed to prevent finding a set of groups R that have high intersection among each other and, thus, avoid over-fitting (and potentially compromising the predictive efficacy of the synthetic control signals). For example, in one implementation, the groups in control subset R may be made to satisfy a condition (referred to as the "weak overlap condition") similar to the following example:

$$\frac{|G_i \cap G_j|}{\min(|G_i|, |G_j|)} \leq \varepsilon_2, \forall\ (i, j) \in R \times R$$

Here, $\varepsilon_2$ is another specified threshold parameter, such as may be fixed, variable, supplied by a user, determined based on prior and/or historical error analyses, and/or the like.

In one implementation, finding a subset of controls R that satisfy both the targeting condition and the weak overlap condition is transformed into a problem of finding independent sets containing the node T in the thresholded graph which is specified in a form similar to the following example:

$$\tilde{G} = \left(V, \left\{(i, j, e_{i,j}) \in E : \begin{cases} e_{i,j} > \varepsilon_1 & \text{if } G_i = T \text{ or } G_j = T \\ e_{i,j} > \varepsilon_2 & \text{otherwise} \end{cases}\right\}\right)$$

Thus, in one implementation, the system first finds a set of candidate groups that verify the targeting and weak overlap conditions (i.e., independent sets in $\tilde{G}$). Then, the system evaluates each candidate group to select the one that best verifies the assumption that the synthetic control signals are good predictors.

Figure 5:
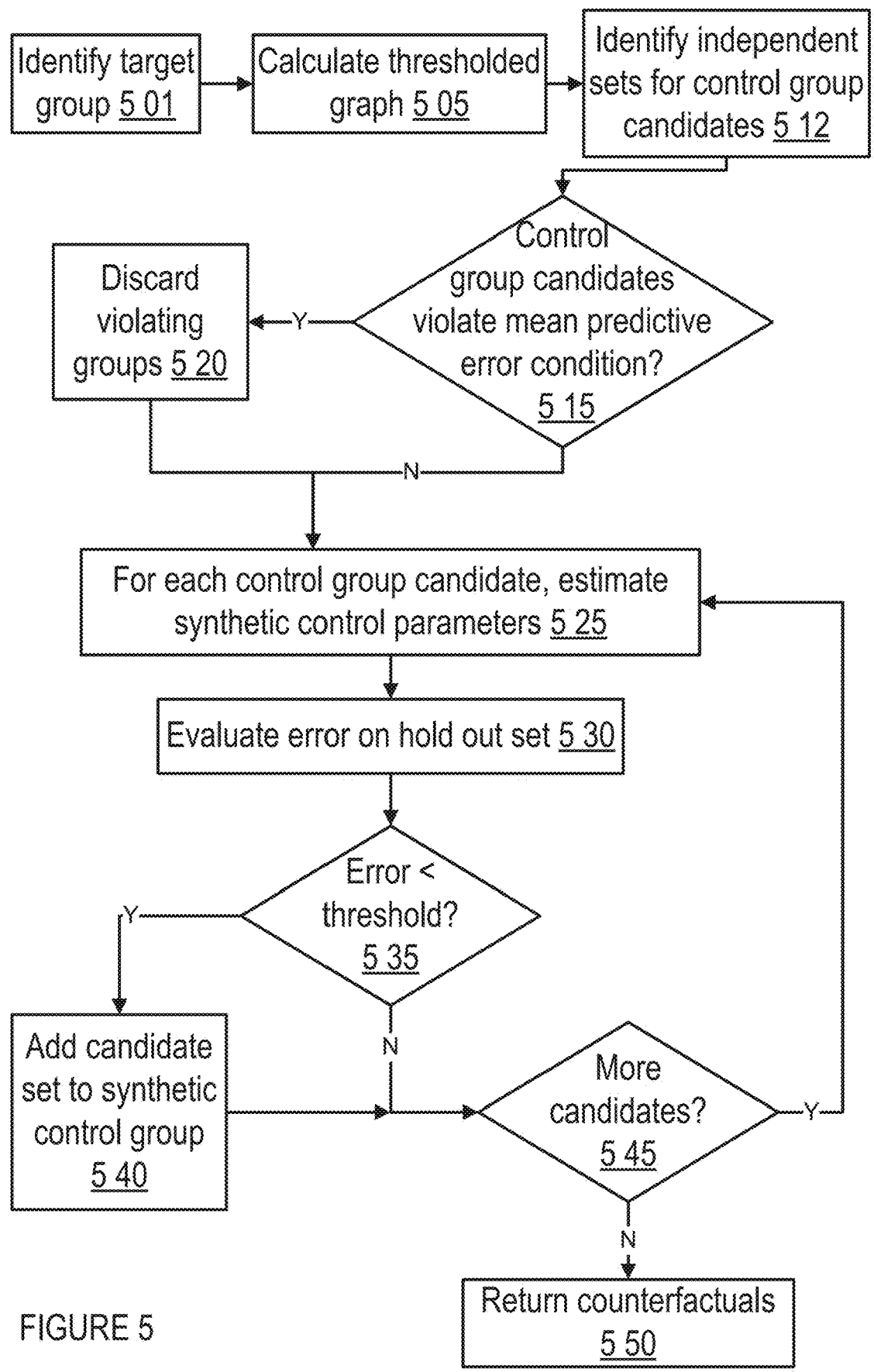
FIG. 5 illustrates the selection and/or determination of control groups in one embodiment of SCG operation.

FIG. 5 illustrates the selection and/or determination of control groups in one embodiment. A target group may be identified 501, and a thresholded graph may be generated 505, as discussed above. Independent sets within the graph may then be identified 512, such as by determining set overlaps as described above. A determination may then be made as to whether the identified control group candidates violate a mean predictive error condition 515, such as that discussed above. If so, those violating groups may be discarded from consideration 520. For each of the remaining groups, synthetic control parameters $\beta^s$ may be estimated 525, such as according to any of the processes described above, and an error may be evaluated on the hold out set complementary to each candidate group 530. If the error is less than a threshold, the candidate set is added to the synthetic control group 540. A determination may be made as to whether there are further candidates for consideration 545 and, if so, the system may return to 525. Otherwise, the counterfactuals constructed from the synthetic control group may be returned 550, such as to a user terminal and/or client interface.

Figure 6:
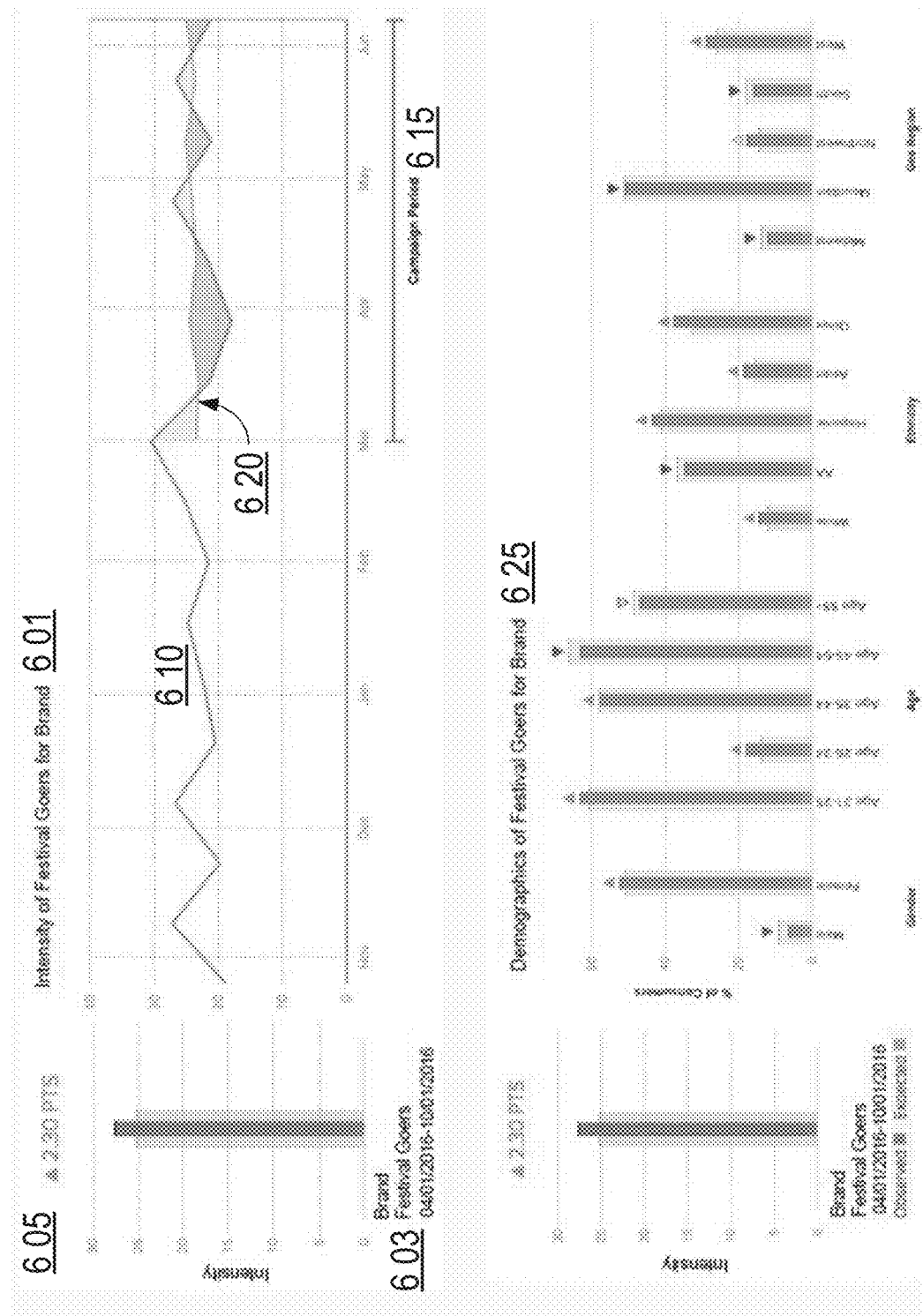
FIG. 6 shows aspects of user interface illustrating campaign impact analysis and synthetic control in one embodiment of SCG operation.

FIG. 6 shows aspects of user interface illustrating campaign impact and synthetic control in one embodiment of SCG operation. A plot of metric (social media intensity) versus time for a particular brand across a target group (festival goers) is shown at 601. Parameters of the displayed data, including the brand, target group, and time period are shown at 603. In one implementation, the display may include an overall campaign impact assessment, such as may be integrated over time, include a score reflecting the net change in the metric resulting from the campaign, and/or the like 605. The display may further include a time-resolved plot of the metric 610, including a designated campaign impact period 615, and an illustration of the synthetic counterfactual 620 and campaign impact (e.g., difference between the measured metric values and values generated according to the synthetic control). In one embodiment, the display may further include a plot of measured and synthetic metric values (and differences thereof) resolved according to various group characteristics (e.g., demographics) 625. This allows, for example, an illustration of which sub-groups are most impacted by the campaign, and by how much, which can be employed to direct further campaign activity and/or placement to maximize effective impact on a given metric or metrics.

SCG Controller

Figure 7:
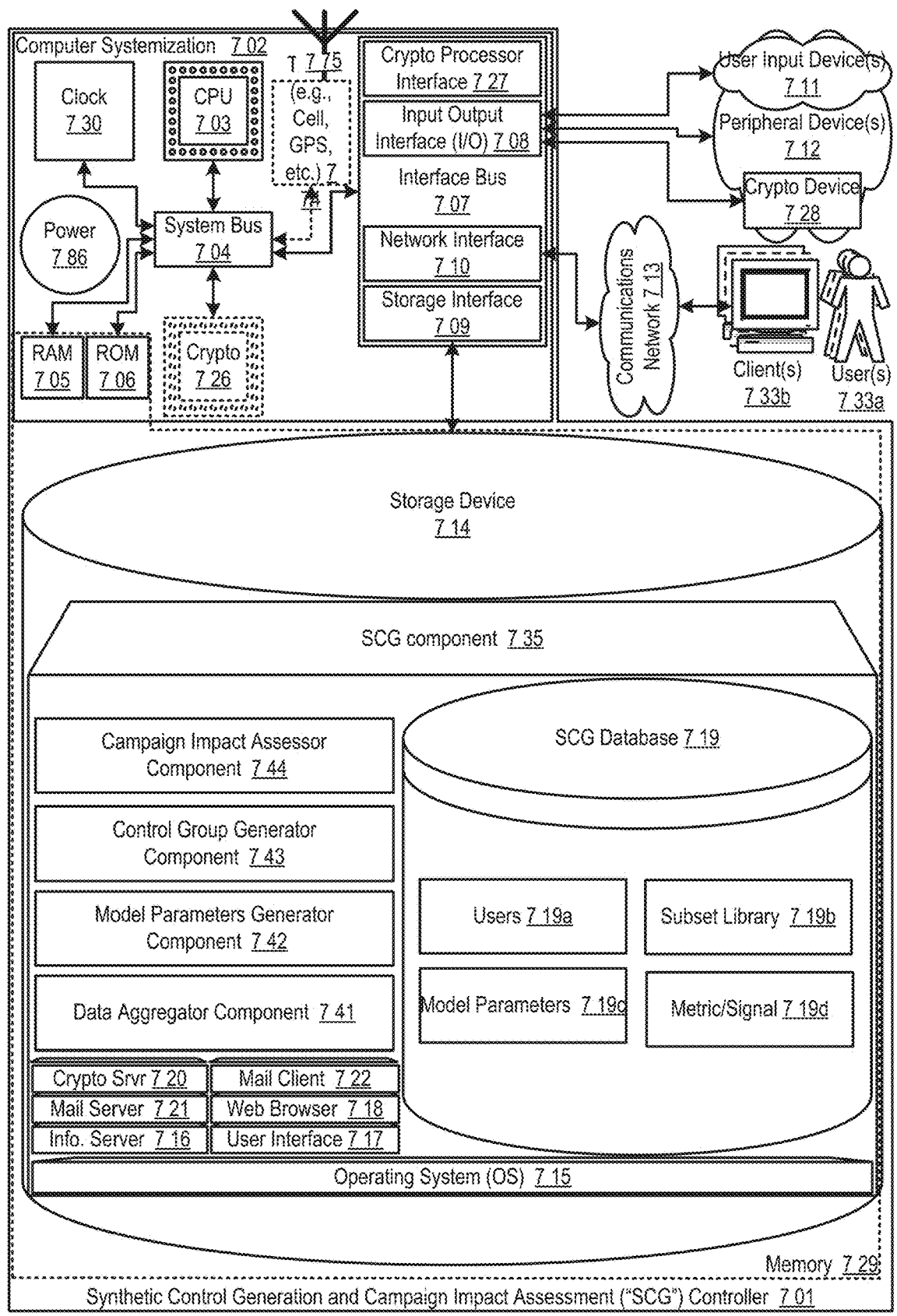
FIG. 7 shows a block diagram illustrating embodiments of a SCG controller.

FIG. 7 shows a block diagram illustrating embodiments of a SCG controller. In this embodiment, the SCG controller 701 may serve to aggregate, process, store, search, serve, identify, instruct, generate, match, and/or facilitate interactions with a computer through market analysis technologies, and/or other related data.

Typically, users, which may be people and/or other systems, may engage information technology systems (e.g., computers) to facilitate information processing. In turn, computers employ processors to process information; such processors 703 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SCG controller 701 may be connected to and/or communicate with entities such as, but not limited to: one or more users from user input devices 711; peripheral devices 712; an optional cryptographic processor device 728; and/or a communications network 713.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SCG controller 701 may be based on computer systems that may comprise, but are not limited to, components such as: a computer systemization 702 connected to memory 729.

Computer Systemization

A computer systemization 702 may comprise a clock 730, central processing unit ("CPU(s)" and/or "processor(s)" (these terms are used interchangeable throughout the disclosure unless noted to the contrary)) 703, a memory 729 (e.g., a read only memory (ROM) 706, a random access memory (RAM) 705, etc.), and/or an interface bus 707, and most frequently, although not necessarily, are all interconnected and/or communicating through a system bus 704 on one or more (mother)board(s) 702 having conductive and/or otherwise transportive circuit pathways through which instructions (e.g., binary encoded signals) may travel to effectuate communications, operations, storage, etc. The computer systemization may be connected to a power source 786; e.g., optionally the power source may be internal. Optionally, a cryptographic processor 726 and/or transceivers (e.g., ICs) 774 may be connected to the system bus. In another embodiment, the cryptographic processor and/or transceivers may be connected as either internal and/or external peripheral devices 712 via the interface bus I/O. In turn, the transceivers may be connected to antenna(s) 775, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing SCG controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 729 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SCG controller and beyond through various interfaces. Should processing requirements dictate a greater amount speed and/or capacity, distributed processors (e.g., Distributed SCG), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the SCG may be achieved by implementing a microcontroller such as CAST's R8051XC2 microcontroller; Intel's MCS 51 (i.e., 8051 microcontroller); and/or the like. Also, to implement certain features of the SCG, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SCG component collection (distributed or otherwise) and/or features may be implemented via the microprocessor and/or via embedded components; e.g., via ASIC, coprocessor, DSP, FPGA, and/or the like. Alternately, some implementations of the SCG may be implemented with embedded components that are configured and used to achieve a variety of features or signal processing.

Depending on the particular implementation, the embedded components may include software solutions, hardware solutions, and/or some combination of both hardware/software solutions. For example, SCG features discussed herein may be achieved through implementing FPGAs, which are a semiconductor devices containing programmable logic components called "logic blocks," and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SCG features. A hierarchy of programmable interconnects allow logic blocks to be interconnected as needed by the SCG system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the SCG may be developed on regular FPGAs and then migrated into a fixed version that more resembles ASIC implementations. Alternate or coordinating implementations may migrate SCG controller features to a final ASIC instead of or in addition to FPGAs. Depending on the implementation all of the aforementioned embedded components and microprocessors may be considered the "CPU" and/or "processor" for the SCG.

Power Source

The power source 786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 786 is connected to at least one of the interconnected subsequent components of the SCG thereby providing an electric current to all subsequent components. In one example, the power source 786 is connected to the system bus component 704. In an alternative embodiment, an outside power source 786 is provided through a connection across the I/O 708 interface. For example, a USB and/or IEEE 1394 connection carries both data and power across the connection and is therefore a suitable source of power.

Interface Adapters

Interface bus(ses) 707 may accept, connect, and/or communicate to a number of interface adapters, conventionally although not necessarily in the form of adapter cards, such as but not limited to: input output interfaces (I/O) 708, storage interfaces 709, network interfaces 710, and/or the like. Optionally, cryptographic processor interfaces 727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 709 may accept, communicate, and/or connect to a number of storage devices such as, but not limited to: storage devices 714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 710 may accept, communicate, and/or connect to a communications network 713. Through a communications network 713, the SCG controller is accessible through remote clients 733b (e.g., computers with web browsers) by users 733a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed SCG), architectures may similarly be employed to pool, load balance, and/or otherwise increase the communicative bandwidth required by the SCG controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 710 may be used to engage with various communications network types 713. For example, multiple network interfaces may be employed to allow for the communication over broadcast, multicast, and/or unicast networks.

Input Output interfaces (I/O) 708 may accept, communicate, and/or connect to user input devices 711, peripheral devices 712, cryptographic processor devices 728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 711 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 712 may be connected and/or communicate to I/O and/or other facilities of the like such as network interfaces, storage interfaces, directly to the interface bus, system bus, the CPU, and/or the like. Peripheral devices may be external, internal and/or part of the SCG controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the SCG controller may be embodied as an embedded, dedicated, and/or monitor-less (i.e., headless) device, wherein access would be provided over a network interface connection.

Cryptographic units such as, but not limited to, microcontrollers, processors 726, interfaces 727, and/or devices 728 may be attached, and/or communicate with the SCG controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 729. However, memory is a fungible technology and resource, thus, any number of memory embodiments may be employed in lieu of or in concert with one another. It is to be understood that the SCG controller and/or a computer systemization may employ various forms of memory 729. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 729 will include ROM 706, RAM 705, and a storage device 714. A storage device 714 may be any conventional computer system storage. Storage devices may include a drum; a (fixed and/or removable) magnetic disk drive; a magneto-optical drive; an optical drive (i.e., Blueray, CD ROM/RAM/Recordable (R)/Re-Writable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 729 may contain a collection of program and/or database components and/or data such as, but not limited to: operating system component(s) 715 (operating system); information server component(s) 716 (information server); user interface component(s) 717 (user interface); Web browser component(s) 718 (Web browser); database(s) 719; mail server component(s) 721; mail client component(s) 722; cryptographic server component(s) 720 (cryptographic server); the SCG component(s) 735; and/or the like (i.e., collectively a component collection). These components may be stored and accessed from the storage devices and/or from storage devices accessible through an interface bus. Although non-conventional program components such as those in the component collection, typically, are stored in a local storage device 714, they may also be loaded and/or stored in memory such as: peripheral devices, RAM, remote storage facilities through a communications network, ROM, various forms of memory, and/or the like.

Operating System

The operating system component 715 is an executable program component facilitating the operation of the SCG controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SCG controller to communicate with other entities through a communications network 713. Various communication protocols may be used by the SCG controller as a subcarrier transport mechanism for interaction, such as, but not limited to: multicast, TCP/IP, UDP, unicast, and/or the like.

Information Server

An information server component 716 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SCG controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SCG database 719, operating systems, other program components, user interfaces, Web browsers, and/or the like.

Access to the SCG database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SCG. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SCG as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 717 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 718 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses.

Also, in place of a Web browser and information server, a combined application may be developed to perform similar operations of both. The combined application would similarly affect the obtaining and the provision of information to users, user agents, and/or the like from the SCG enabled nodes. The combined application may be nugatory on systems employing standard Web browsers.

Mail Server

A mail server component 721 is a stored program component that is executed by a CPU 703. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SCG.

Access to the SCG mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 722 is a stored program component that is executed by a CPU 703. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 720 is a stored program component that is executed by a CPU 703, cryptographic processor 726, cryptographic processor interface 727, cryptographic processor device 728, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the SCG may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SCG component to engage in secure transactions if so desired. The cryptographic component facilitates the secure accessing of resources on the SCG and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SCG Database

The SCG database component 719 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the SCG database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SCG database is implemented as a data-structure, the use of the SCG database 719 may be integrated into another component such as the SCG component 735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 719 includes several tables 719a-1. A Users table 719a may include fields such as, but not limited to: user ID, name, login, password, demographic information, interest information, activity information, membership information, financial information, and/or the like. The user table may support and/or track multiple entity accounts on a SCG. An Subset Library table 719b may include fields such as, but not limited to: user profile sets and/or subsets, synthetic control signals, candidate synthetic control signals, target sets, hold over sets, and/or the like. A Model Parameters table 719c may include fields such as, but not limited to: error thresholds, synthetic control parameters, coefficients, weighting factors, and/or the like. A Metric/Signal table 719d may include fields such as, but not limited to: raw_data_ID, data_feed_ID(s), raw_data_type, raw_data_content, fields, raw_data_parameters, metric data, synthetic control signal data, time, and/or the like. In one implementation, the data feed may be populated by a social media data feed (e.g., Facebook status updates, Twitter feed, and/or the like), by a market data feed (e.g., Bloomberg's PhatPipe, Dun & Bradstreet, Reuter'sTib, Triarch, etc.), and/or the like, such as, for example, through Microsoft's Active Template Library and Dealing Object Technology's real-time toolkit Rtt.Multi.

In one embodiment, the SCG database may interact with other database systems. For example, employing a distributed database system, queries and data access by search SCG component may treat the combination of the SCG database, an integrated data security layer database as a single database entity.

In one embodiment, user programs may contain various user interface primitives, which may serve to update the SCG. Also, various accounts may require custom database tables depending upon the environments and the types of clients the SCG may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 719a-1. The SCG may be configured to keep track of various settings, inputs, and parameters via database controllers.

The SCG database may communicate to and/or with other components in a component collection, including itself, and/or facilities of the like. Most frequently, the SCG database communicates with the SCG component, other program components, and/or the like. The database may contain, retain, and provide information regarding other nodes and data.

The SCGs

The SCG component 735 is a stored program component that is executed by a CPU. In one embodiment, the SCG component incorporates any and/or all combinations of the aspects of the SCG that was discussed in the previous figures. As such, the SCG affects accessing, obtaining and the provision of information, services, transactions, and/or the like across various communications networks. The features and embodiments of the SCG discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the SCG's features and facilities, and in many cases reduce the costs, energy consumption/requirements, and extend the life of SCG's underlying infrastructure; this has the added benefit of making the SCG more reliable. Similarly, many of the features and mechanisms are designed to be easier for users to use and access, thereby broadening the audience that may enjoy/employ and exploit the feature sets of the SCG; such ease of use also helps to increase the reliability of the SCG. In addition, the feature sets include heightened security as noted via the Cryptographic components 720, 726, and throughout, making access to the features and data more reliable and secure The SCG transforms raw data, model parameters, and, UI interaction inputs via SCG Data Aggregator 741, Model Parameters Generator 742, Control Group Generator 743, and Campaign Impact Assessor 744 components into campaign impact outputs, synthetic control signals, synthetic control parameters, campaign efficacy metrics, and/or the like.

The SCG component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the SCG server employs a cryptographic server to encrypt and decrypt communications. The SCG component may communicate to and/or with other components in a component collection, including itself, and/or facilities of the like. Most frequently, the SCG component communicates with the SCG database, operating systems, other program components, and/or the like. The SCG may contain, communicate, generate, obtain, and/or provide program component, system, user, and/or data communications, requests, and/or responses.

Distributed SCGs

The structure and/or operation of any of the SCG node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SCG controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SCG controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plaid');
// set ip address and port to listen to for incoming data
$address = '192.168.0.100';
$port = 255;
// create a server-side SSL socket, listen for/
accept incoming communication
$sock = socket_create(AF_INET, SOCK_STREAM, 0);
socket_bind($sock, $address, $port) or die
('Could not bind to address');
socket_listen($sock);
$client = socket_accept($sock);
// read input data from client device in 1024
byte blocks until end of message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password);
// access database server
mysql_select("CLIENT_DB.SQL"); // select database to append
mysql_query("INSERT INTO UserTable (transmission)
VALUES ($data)"); // add data to UserTable
```

-continued

```
table in a CLIENT database
mysql_close("CLIENT_DB.SQL"); //
close connection to database
?>
```

Also, the following resources may be used to provide example embodiments regarding SOAP parser implementation:
http://www.xav.com/perl/site/lib/SOAP/Parser.html
http://publib.boulder.ibm.com/infocenter/tivihelp/v2r1/
    index.jsp?topic=/com.ibm.IBMDI.doc/
    referenceguide295.htm
and other parser implementations:
http://publib.boulder.ibm.com/infocenter/tivihelp/v2r1/
    index.jsp?topic=/com.ibm.IBMDI.doc/
    referenceguide259.htm
all of which are hereby expressly incorporated by reference.

In order to address various issues and advance the art, the entirety of this application for SYNTHETIC CONTROL GENERATION AND CAMPAIGN IMPACT ASSESSMENT APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others.

In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims.

What is claimed is:

1. A processor-implemented method, comprising:
accessing social media data from at least one social media feed;
storing the social media data in a first storage node;
partitioning a collection of user profiles into a plurality of user subsets based on at least one profile characteristic, wherein partitioning the collection of user profiles into the plurality of user subsets based on the at least one profile characteristic further comprises:
dynamically loading the user profiles on demand from the social media data into a distributed controller system,
wherein the partitioning of the user profiles is performed by the distributed controller system with load balancing based on at least one of controller capacity, controller location, and controller usage;
storing the plurality of user subsets in a second storage node;
generating an intersection graph, wherein each node of the intersection graph corresponds to one of the plurality of user subsets;
determining the number of users assigned to a first node of the intersection graph who are also assigned to a second node of the intersection graph, the first and second nodes being connected by the each edge;
assigning a weight for each edge of the intersection graph based on the number of users assigned to the first node and to the second node, without regard for a number of shared connections between the first node and the second node,
wherein assigning the weight for each edge of the intersection graph further comprises:
dynamically loading weighting coefficients on demand from a third storage node, and
applying the weighting coefficients to determine the weight for each edge;
identifying at least one target group from the plurality of user subsets and at least one campaign period;
collecting measurements of target metric data for the target group at different points in time, including points in the campaign period;
collecting measurements of non-target metric data for each of the plurality of user subsets other than the target group at the different points in time;
generating a counterfactual baseline from the non-target metric data and at least one set of synthetic control parameters; and
generating at least one campaign impact metric based on comparing the target metric data with the counterfactual baseline.

2. The method of claim 1, further comprising:
selecting a metric corresponding to the target metric data and the non-target metric data.

3. The method of claim 1, wherein the target metric data and non-target metric data correspond to a user activity metric.

4. The method of claim 3, wherein the user activity metric characterizes activity on at least one online social network.

5. The method of claim 1, further comprising:
determining the set of synthetic control parameters.

6. The method of claim 5, wherein determining the set of synthetic control parameters further comprises:
solving a least squares problem based on the target metric data and the non-target metric data evaluated at time points outside the campaign period.

7. The method of claim 5, wherein determining the set of synthetic control parameters further comprises:
determining maximum-likelihood estimates of a linear regression model with Seasonal Auto Regressive Integrated Moving Average errors based on target metric data evaluated at time points outside the campaign period.

8. The method of claim 5, wherein determining the set of synthetic control parameters further comprises:
sampling a posterior distribution of observations in a state-space model employing Bayesian time series.

9. The method of claim 5, wherein determining the set of synthetic control parameters further comprises:
receiving selection of an error term model.

10. The method of claim 1, wherein an overlap between the target group and each of the plurality of user subsets other than the target group is less than a first threshold amount.

11. The method of claim 10, further comprising:
evaluating the overlap between the target group and each of the plurality of user subsets other than the target group;
comparing the overlap to the first threshold amount; and
excluding from the counterfactual baseline each of the plurality of user subsets having an overlap greater than the first threshold amount.

12. The method of claim 1, wherein an overlap between any pair of the plurality of user subsets other than the target group is less than a second threshold amount.

13. The method of claim 12, further comprising:
evaluating the overlap between pairs of the plurality of user subsets other than the target group;
comparing the overlap to the second threshold amount; and
excluding from the counterfactual baseline each of the plurality of user subsets having an overlap greater than the second threshold amount.

14. The method of claim 1, further comprising:
identifying a control subset of user profiles from the plurality of user subsets other than the target group; and
wherein the non-target metric data is limited to the control subset.

15. The method of claim 14, wherein identifying the control subset further comprises:
identifying a training subset from the plurality of user subsets other than the target group;
determining a set of synthetic training control parameters;
generating a training counterfactual baseline from training metric data and the set of synthetic training control parameters;
determining a mean predictive error comprising a normalized sum of an error function evaluated between the target metric data and the training counterfactual baseline; and identifying the control subset as the training subset when the mean predictive error is less than a third threshold amount.

16. The method of claim 15, wherein the error function comprises a mean square error.

17. The method of claim 15, wherein the error function comprises a mean absolute percentage error.

18. The method of claim 15, wherein the error function comprises a mean error.

19. The method of claim 1, further comprising:
placing an advertisement based on the at least one campaign metric.

20. An apparatus, comprising:
a processor;
a memory communicatively coupled to the processor and containing program instructions configured to cause the processor to:
access social media data from at least one social media feed;
store the social media data in a first storage node;
partition a collection of user profiles into a plurality of user subsets based on at least one profile characteristic,
wherein partitioning the collection of user profiles into the plurality of user subsets based on the at least one profile characteristic further comprises:
dynamically load the user profiles on demand from the social media data into a distributed controller system,
wherein the partitioning of the user profiles is performed by the distributed controller system with load balancing based on at least one of controller capacity, controller location, and controller usage;
store the plurality of user subsets in a second storage node;
generate an intersection graph, wherein each node of the intersection graph corresponds to one of the plurality of user subsets;
determine the number of users assigned to a first node of the intersection graph who are also assigned to a second node of the intersection graph, the first and second nodes being connected by the each edge;
assign a weight for each edge of the intersection graph based on the number of users assigned to the first node and to the second node, without regard for a number of shared connections between the first node and the second node,
wherein assigning the weight for each edge of the intersection graph further comprises:
dynamically load weighting coefficients on demand from a third storage node, and
apply the weighting coefficients to determine the weight for each edge;
identify at least one target group from the plurality of user subsets and at least one campaign period;
collect measurements of target metric data for the target group at different points in time, including points in the campaign period;
collect measurements of non-target metric data for each of the plurality of user subsets other than the target group at the different points in time;
generate a counterfactual baseline from the non-target metric data and at least one set of synthetic control parameters; and
generate at least one campaign impact metric based on comparing the target metric data with the counterfactual baseline.

21. A processor-accessible non-transitory medium, comprising a plurality of program instructions stored on the medium, the instructions comprising:
access social media data from at least one social media feed;
store the social media data in a first storage node;
partition a collection of user profiles into a plurality of user subsets based on at least one profile characteristic,
wherein partitioning the collection of user profiles into the plurality of user subsets based on the at least one profile characteristic further comprises:
dynamically load the user profiles on demand from the social media data into a distributed controller system,
wherein the partitioning of the user profiles is performed by the distributed controller system with load balancing based on at least one of controller capacity, controller location, and controller usage;
store the plurality of user subsets in a second storage node;
generate an intersection graph, wherein each node of the intersection graph corresponds to one of the plurality of user subsets;
determine the number of users assigned to a first node of the intersection graph who are also assigned to a second node of the intersection graph, the first and second nodes being connected by the each edge;
assign a weight for each edge of the intersection graph based on the number of users assigned to the first node and to the second node, without regard for a number of shared connections between the first node and the second node
wherein assigning the weight for each edge of the intersection graph further comprises:
dynamically load weighting coefficients on demand from a third storage node, and
apply the weighting coefficients to determine the weight for each edge;
identify at least one target group from the plurality of user subsets and at least one campaign period;
collect measurements of target metric data for the target group at different points in time, including points in the campaign period;
collect measurements of non-target metric data for each of the plurality of user subsets other than the target group at the different points in time;
generate a counterfactual baseline from the non-target metric data and at least one set of synthetic control parameters; and
generate at least one campaign impact metric based on comparing the target metric data with the counterfactual baseline.

* * * * *